US010821928B2

(12) United States Patent
Deng et al.

(10) Patent No.: US 10,821,928 B2
(45) Date of Patent: Nov. 3, 2020

(54) VEHICLE AIRBAG OPERATION (71) Applicant: Ford Global Technologies, LLC, Dearborn, MI (US)

(72) Inventors: Zhibing Deng, Northville, MI (US); Deepak Patel, Canton, MI (US); Krishnakanth E. Aekbote, Novi, MI (US); Srinivas Reddy Malapati, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 128 days.

(21) Appl. No.: 16/156,405

(22) Filed: Oct. 10, 2018

(65) Prior Publication Data
US 2020/0114855 A1    Apr. 16, 2020

(51) Int. Cl.
| *B60R 21/00* | (2006.01) |
| *B60R 21/16* | (2006.01) |
| *B60R 21/216* | (2011.01) |
| *B60R 21/015* | (2006.01) |
| *B60R 21/2338* | (2011.01) |
| *B60R 21/013* | (2006.01) |
| *B60R 21/20* | (2011.01) |
| *B60R 21/01* | (2006.01) |
| *B60N 2/14* | (2006.01) |
| *B60N 3/00* | (2006.01) |

(52) U.S. Cl.
CPC ...... *B60R 21/01554* (2014.10); *B60R 21/013* (2013.01); *B60R 21/20* (2013.01); *B60R 21/2338* (2013.01); *B60N 2/14* (2013.01); *B60N 3/001* (2013.01); *B60R 2021/0032* (2013.01); *B60R 2021/01238* (2013.01)

(58) Field of Classification Search
None
See application file for complete search history.

(56) References Cited

U.S. PATENT DOCUMENTS

| 5,000,505 | A | * | 3/1991 | Kawashita | ............. B60N 2/143 |
| | | | | | 296/64 |
| 6,349,964 | B1 | | 2/2002 | Acker et al. | |
| 6,474,741 | B2 | * | 11/2002 | Kamida | ................... B60N 2/91 |
| | | | | | 297/378.12 |
| 7,347,445 | B2 | * | 3/2008 | Choi | ..................... B60R 21/233 |
| | | | | | 280/729 |
| 7,695,002 | B2 | | 4/2010 | Choi | |
| 7,802,809 | B2 | * | 9/2010 | Ryan | ..................... B60R 21/231 |
| | | | | | 280/730.2 |
| 8,414,018 | B2 | | 4/2013 | Choi et al. | |
| 8,882,138 | B1 | * | 11/2014 | Hicken | ................. B60R 21/231 |
| | | | | | 280/730.1 |
| 9,650,011 | B1 | | 5/2017 | Belwafa | |
| 9,682,681 | B1 | * | 6/2017 | Patel | ................. B60R 21/01512 |
| 9,981,622 | B2 | * | 5/2018 | Ohmura | ............. B60R 21/0136 |
| 10,023,146 | B2 | * | 7/2018 | Faruque | ................ B60R 21/233 |

(Continued)

*Primary Examiner* — Adam D Tissot
(74) *Attorney, Agent, or Firm* — Frank A. MacKenzie; Bejin Bieneman PLC (57) ABSTRACT

A system includes an airbag including a first lobe, a second lobe, a first tether connected to the first lobe, and a second tether connected to the second lobe, a seat rotatable relative to the airbag from a first position to a second position, and a computer programmed to, based on whether the seat is in the first position or the second position, release one of the first tether or the second tether.

18 Claims, 12 Drawing Sheets

(56) References Cited

U.S. PATENT DOCUMENTS

| | | | |
|---|---|---|---|
| 10,252,693 B2 * | 4/2019 | Numazawa | B60N 2/143 |
| 2004/0232666 A1 * | 11/2004 | Sato | B60R 21/23138 |
| | | | 280/730.2 |
| 2007/0102905 A1 * | 5/2007 | Ryan | B60R 21/207 |
| | | | 280/730.2 |
| 2009/0026743 A1 | 1/2009 | Arez | |
| 2009/0283994 A1 * | 11/2009 | Ruthinowski | B60R 21/18 |
| | | | 280/733 |
| 2017/0259772 A1 | 9/2017 | Farooq et al. | |
| 2018/0126941 A1 | 5/2018 | Faruque et al. | |
| 2019/0111880 A1 * | 4/2019 | Choi | B60R 21/2338 |

* cited by examiner

FIG. 12

VEHICLE AIRBAG OPERATION

BACKGROUND

Vehicles include seats to support occupants. The seats each include a seat back and a seat bottom. The seat bottom supports an occupant vertically. The seat back may be adjustable by an occupant by rotating the seat back relative to the seat bottom. The seat may be adjustable by the occupant by moving the seat in a vehicle fore-aft direction, e.g., to accommodate the occupant's legs. For example, the occupant may move the seat along a track to a specified position.

An interior of a vehicle, such as automobile, may include various devices for controlling kinematics of a test dummy of the vehicle during an impact test. For example, the vehicle may include an airbag supported by a steering wheel or a vehicle seat. The airbag may be configured to control kinematics of the test dummy during a vehicle impact.

DETAILED DESCRIPTION

A system includes an airbag including a first lobe, a second lobe, a first tether connected to the first lobe, and a second tether connected to the second lobe, a seat rotatable relative to the airbag from a first position to a second position, and a computer programmed to, based on whether the seat is in the first position or the second position, release one of the first tether or the second tether.

The computer may be further programmed to detect an impact and, then, release one of the first tether or the second tether.

The system may further include a table, the airbag may be fixed to the table, and the seat may be rotatable relative to the table. The seat may be rotatable about an axis normal to the table.

The system may further include a tether release, wherein the computer may be further programmed to actuate the tether release to release the first tether or the second tether.

The seat may have a side and the computer may be further programmed to inflate the airbag along the side.

The seat may face a first facing direction in the first position. The seat may face a second facing direction in the second position. The first lobe may be designed to inflate toward the first facing direction. The second lobe may be designed to inflate toward the second facing direction.

The computer may be further programmed to inflate the first lobe toward the first facing direction when the seat is in the first position and to inflate the second lobe toward the second facing direction when the seat is in the second position.

The system may further include a vehicle door. The airbag may be between the vehicle door and the seat.

The seat may be rotatable to an intermediate position between the first position and the second position.

A system includes a computer including a processor and a memory, the memory storing instructions executable by the processor to identify a facing direction of a vehicle seat, and, based on the facing direction, release one of a first tether connected to a first lobe of an airbag or a second tether connected to a second lobe of the airbag.

The instructions may further include instructions to detect an impact and, then, release one of the first tether or the second tether.

The instructions may further include instructions to actuate a tether release to release the first tether or the second tether.

The instructions may further include instructions to inflate one of the first lobe of the airbag or the second lobe of the airbag based on the facing direction.

The facing direction of the seat may include a first direction and a second direction. The first lobe may be arranged to inflate toward the first direction. The second lobe may be arranged to inflate toward the second direction.

The seat may define an occupant seating area facing toward the facing direction.

An assembly includes a track, a table slidable relative to the track, an airbag fixed to the table, and a seat rotatable relative to the table and the airbag.

The seat may be rotatable from a first position to a second position.

The airbag may include a first lobe, a second lobe, a first tether connected to the first lobe, and a second tether connected to the second lobe.

The seat may be rotatable about an axis normal to the table.

With reference to the Figures, wherein like numerals indicate like parts throughout the several views, a system 10 in a vehicle 12 includes an airbag 14 including a first lobe 16, a second lobe 18, a first tether 20 connected to the first lobe 16, and a second tether 22 connected to the second lobe 18, a seat 24 rotatable relative to the airbag 14 from a first position to a second position, and a computer 26 programmed to, based on whether the seat 24 is in the first position or the second position, release one of the first tether 20 or the second tether 22.

The selective release of one of the first tether 20 or the second tether 22 allows the airbag 14 to inflate to control kinematics of a test dummy during a side impact test for each position to which the seat 24 is rotated. That is, because the seat 24 is rotatable relative to the airbag 14, the airbag 14 may control kinematics of the test dummy whether the seat 24 is rotated to the first position or the second position. The first lobe 16 and the second lobe 18 may control kinematics of an upper portion of the test dummy, e.g., a thoracic portion, a torso, etc. The computer 26 selectively releasing one of the first tether 20 or the second tether 22 allows one of the first lobe 16 or the second lobe 18 to inflate and control kinematics of the test dummy based on the rotated position of the seat 24. The first lobe 16 and the second lobe 18 may control kinematics of the test dummy when a seat back (shown but not numbered) of the seat 24 is at different angles relative to a neutral position, e.g., 20 degrees, 24 degrees, etc., for impact test protocols.

Figure 10:
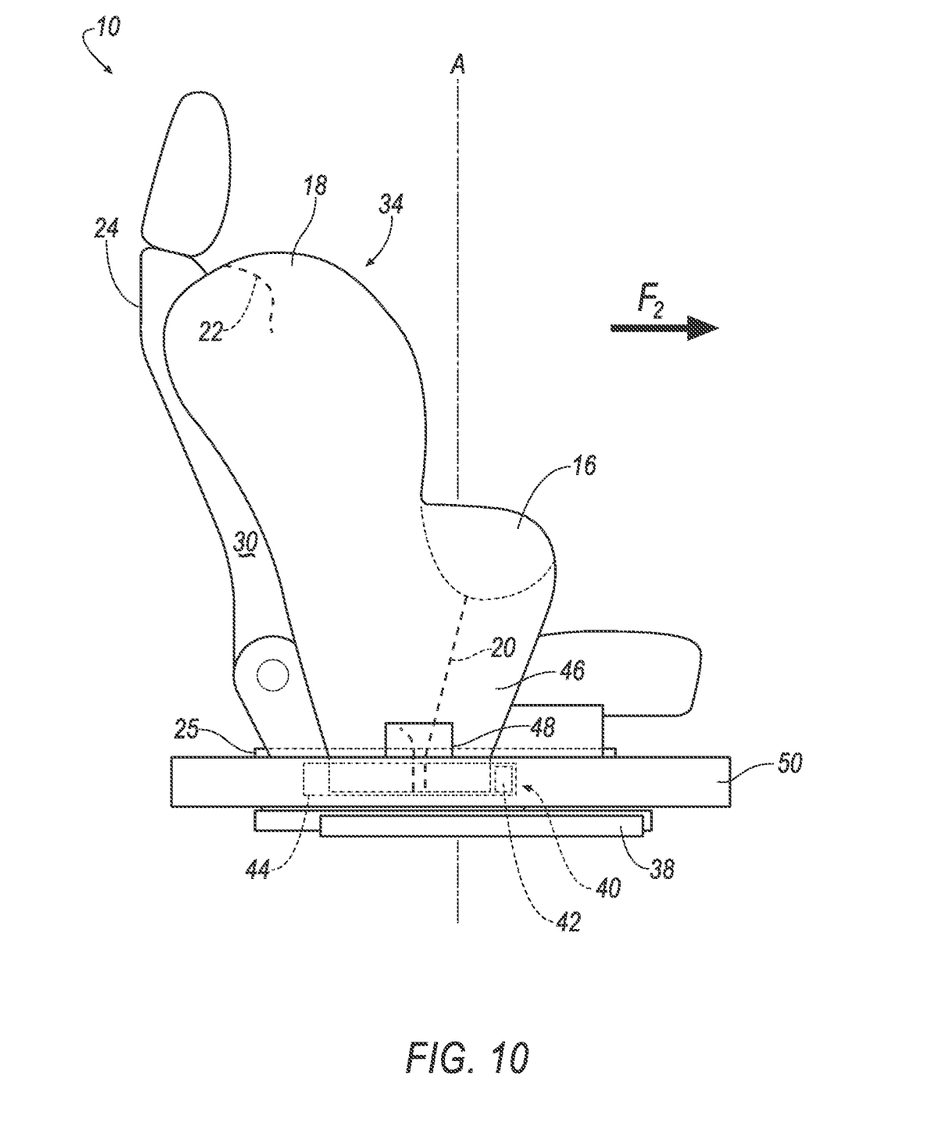
FIG. 10 is a side view of the seat and a second tether of the airbag released.
Figure 11:
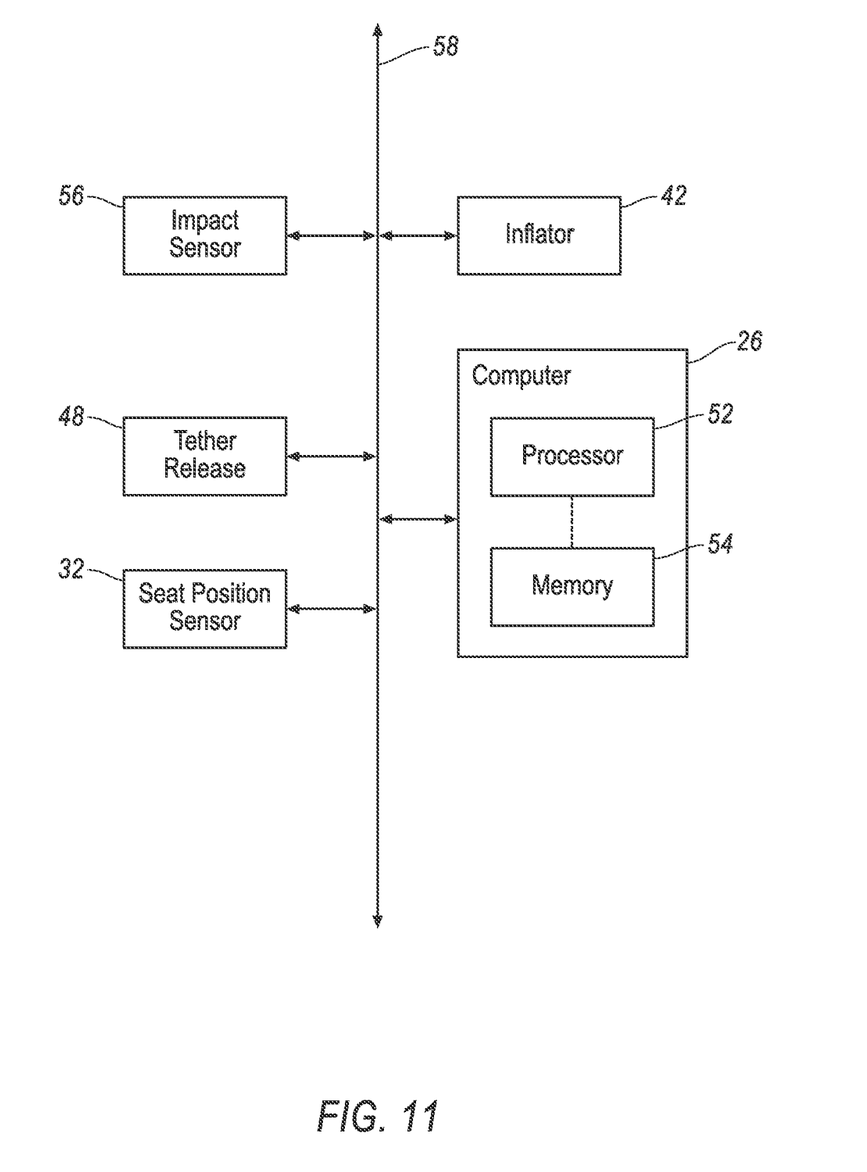
FIG. 11 is a block diagram of a computer in the vehicle.

The vehicle 12 includes the seat 24, as shown in FIGS. 1-10. The seat 24 is rotatable from a first position, as shown in FIGS. 1, 3, and 5-7, to a second position, as shown in FIGS. 2, 4, and 8-10. The seat 24 may be supported by a rotation device 25 to rotate the seat 24 between the first position and the second position. The rotation device 25 may be, e.g., a rotatable ring, a post, etc. The seat 24 may be rotatable to an intermediate position between the first position and the second position. The seat 24 is locked in place in the first position or the second position. In other words, the rotation device 25 is locked to lock the seat 24 in the first position or the second position. The occupant may selectively actuate the rotation device 25 to lock the seat 24, e.g., with a mechanical lever, an electronic solenoid lock, etc. The seat 24 and/or the rotation device 25 may include a seat position sensor 32, as shown in FIG. 11. The seat position sensor 32 may be programmed to detect the position of the seat 24. The seat 24 has a pair of opposing sides 28, 30, i.e., a first side 28 of the seat 24 and a second side 30 of the seat 24.

The seat 24 faces in a facing direction. The facing direction of the seat 24 may include a first direction $F_1$ and a second direction $F_2$, as shown in FIGS. 5-10. When the seat 24 is in the first position, the seat 24 faces the first direction $F_1$. When the seat 24 is in the second position, the seat 24 faces the second direction $F_2$. The first direction $F_1$ may be a vehicle-forward direction. The second direction $F_2$ may be a vehicle-rearward direction. The seat 24 may define an occupant seating area 34 that faces toward the facing direction $F_1$, $F_2$. The occupant seating area 34 may support an occupant and/or the test dummy.

Figure 1:
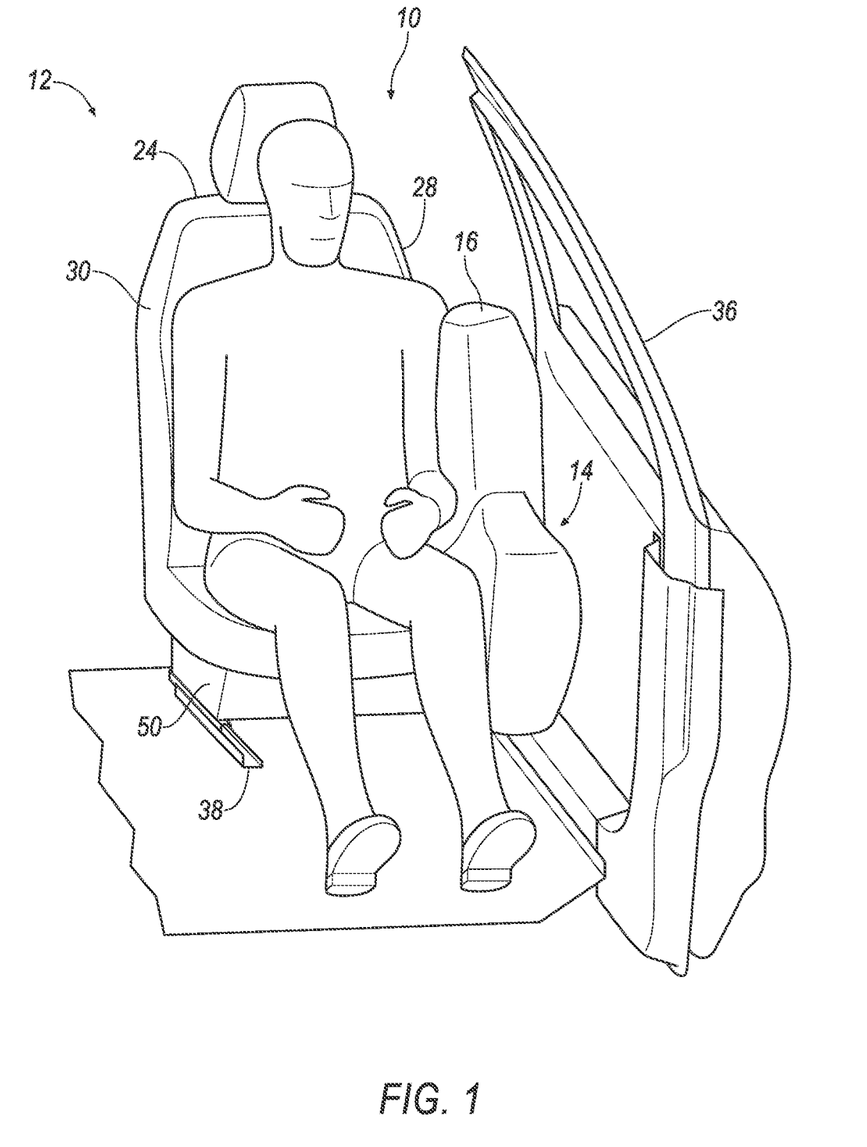
FIG. 1 is a perspective view of a seat in a first position in a vehicle.
Figure 2:
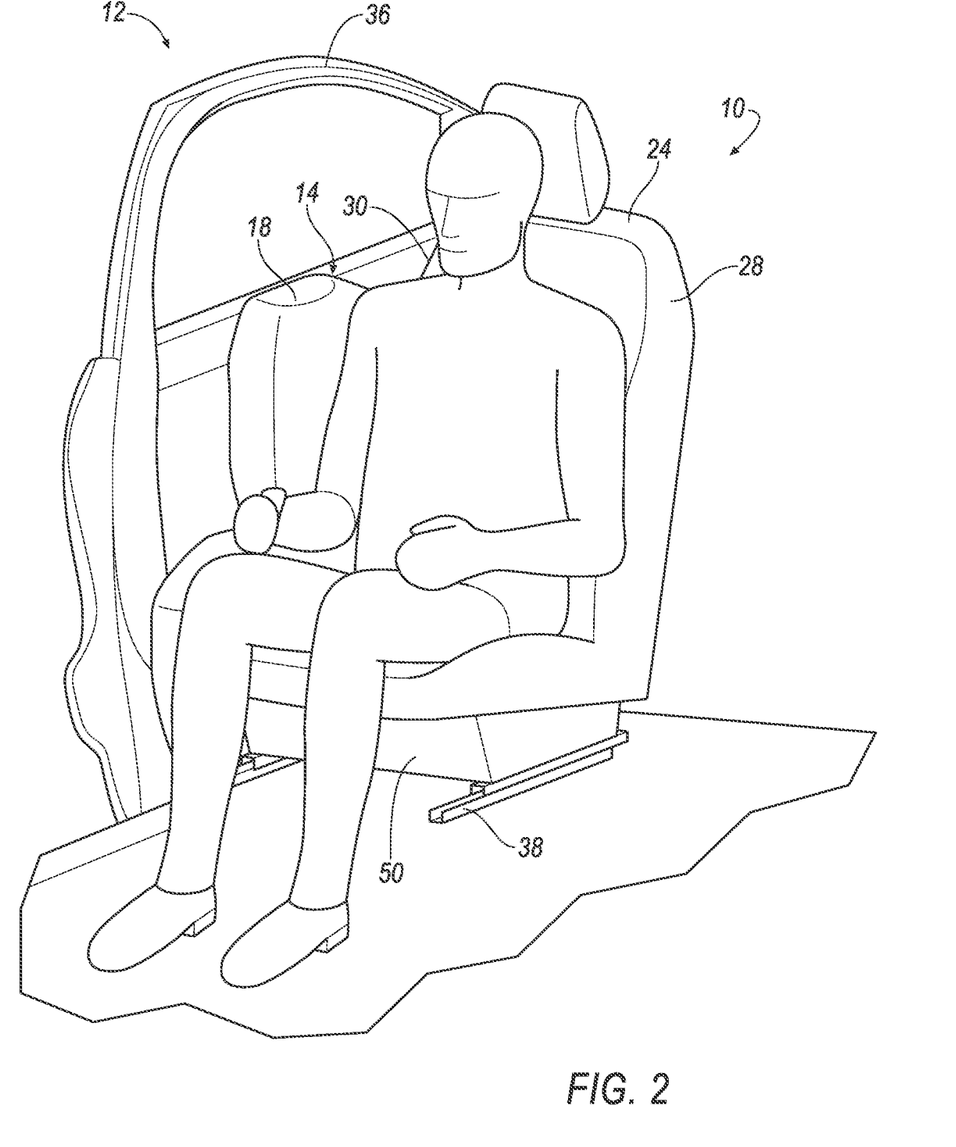
FIG. 2 is a perspective view of the seat in a second position.
Figure 3:
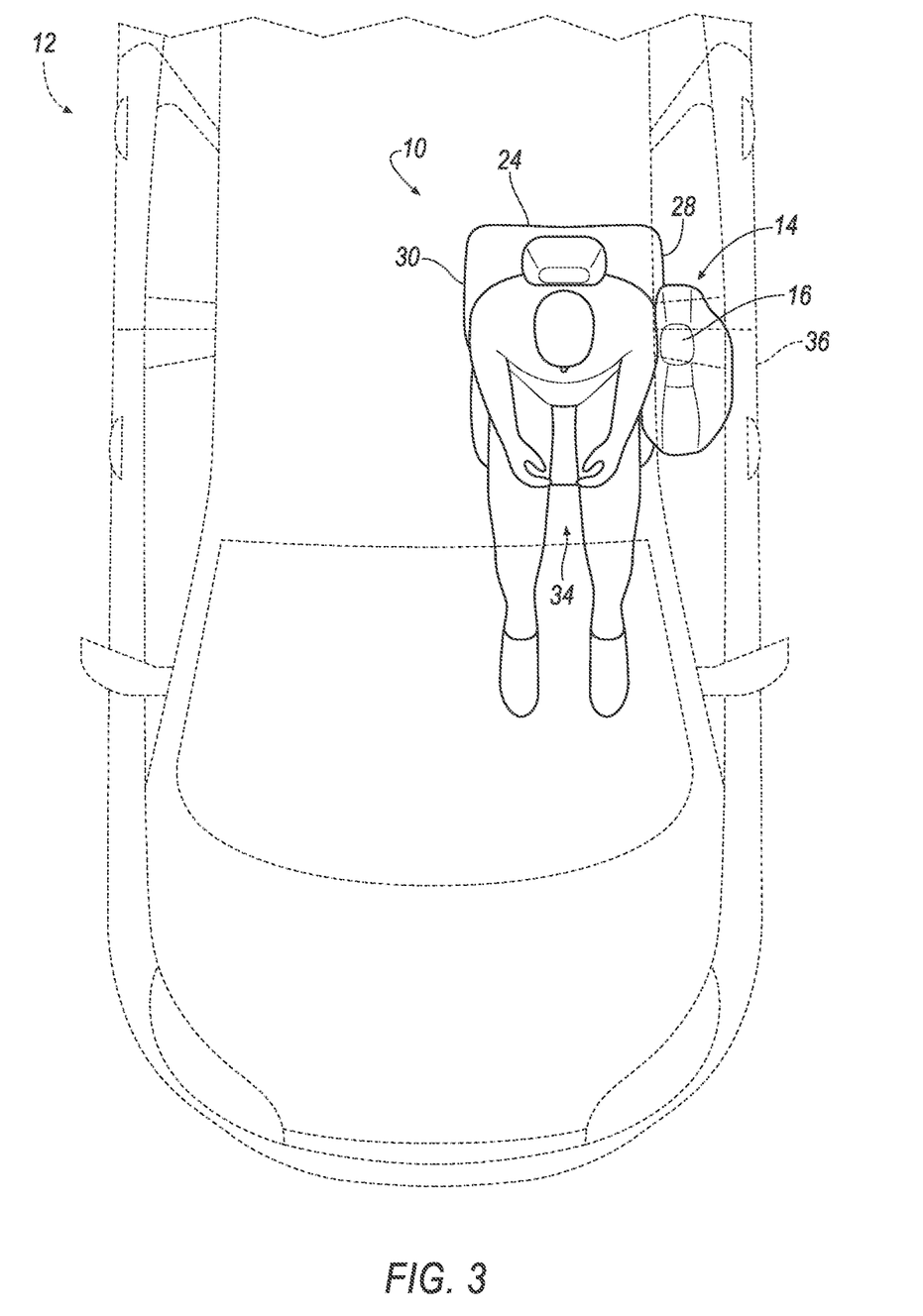
FIG. 3 is a plan view of the seat in the first position.
Figure 4:
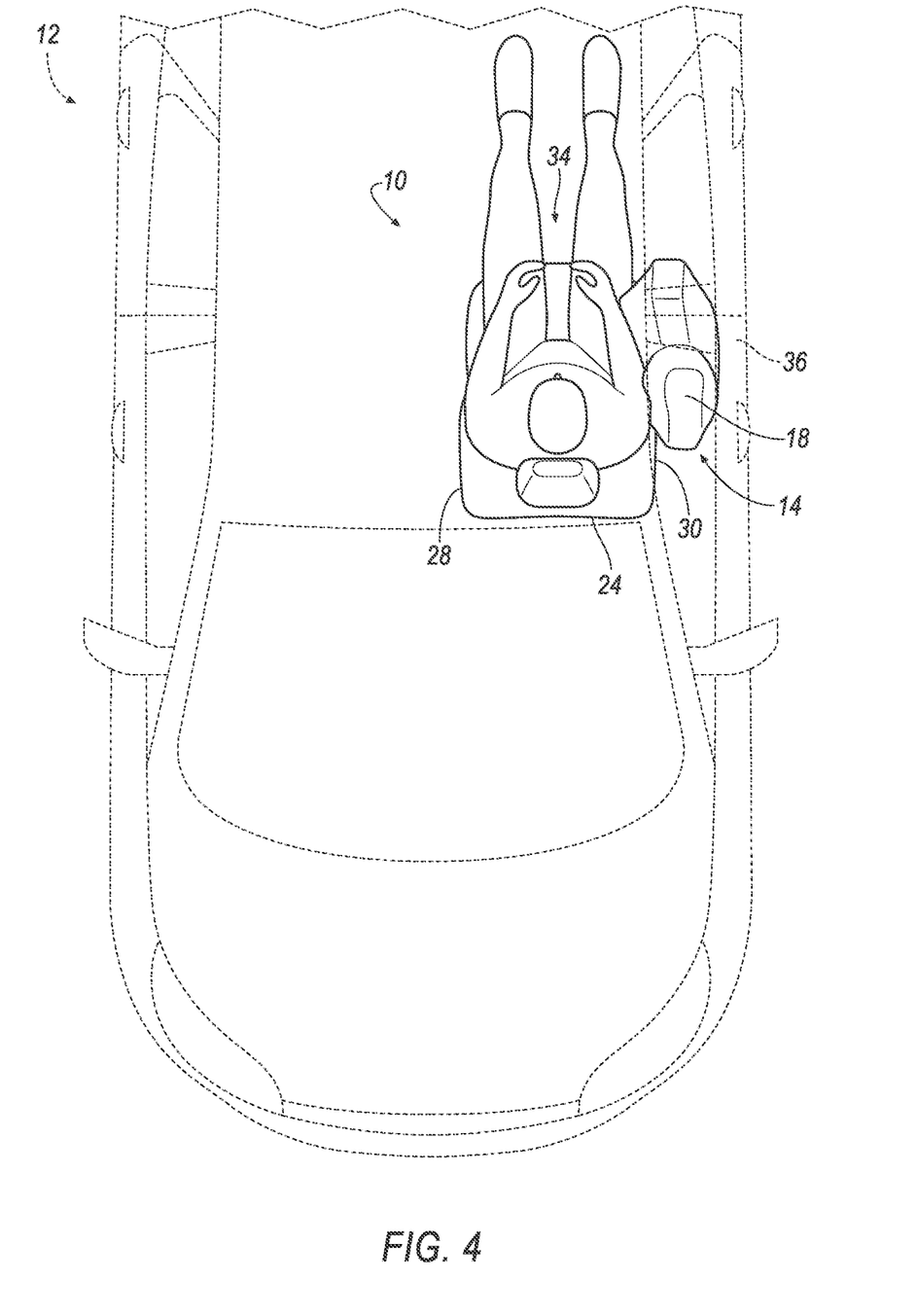
FIG. 4 is a plan view of the seat in the second position.
Figure 5:
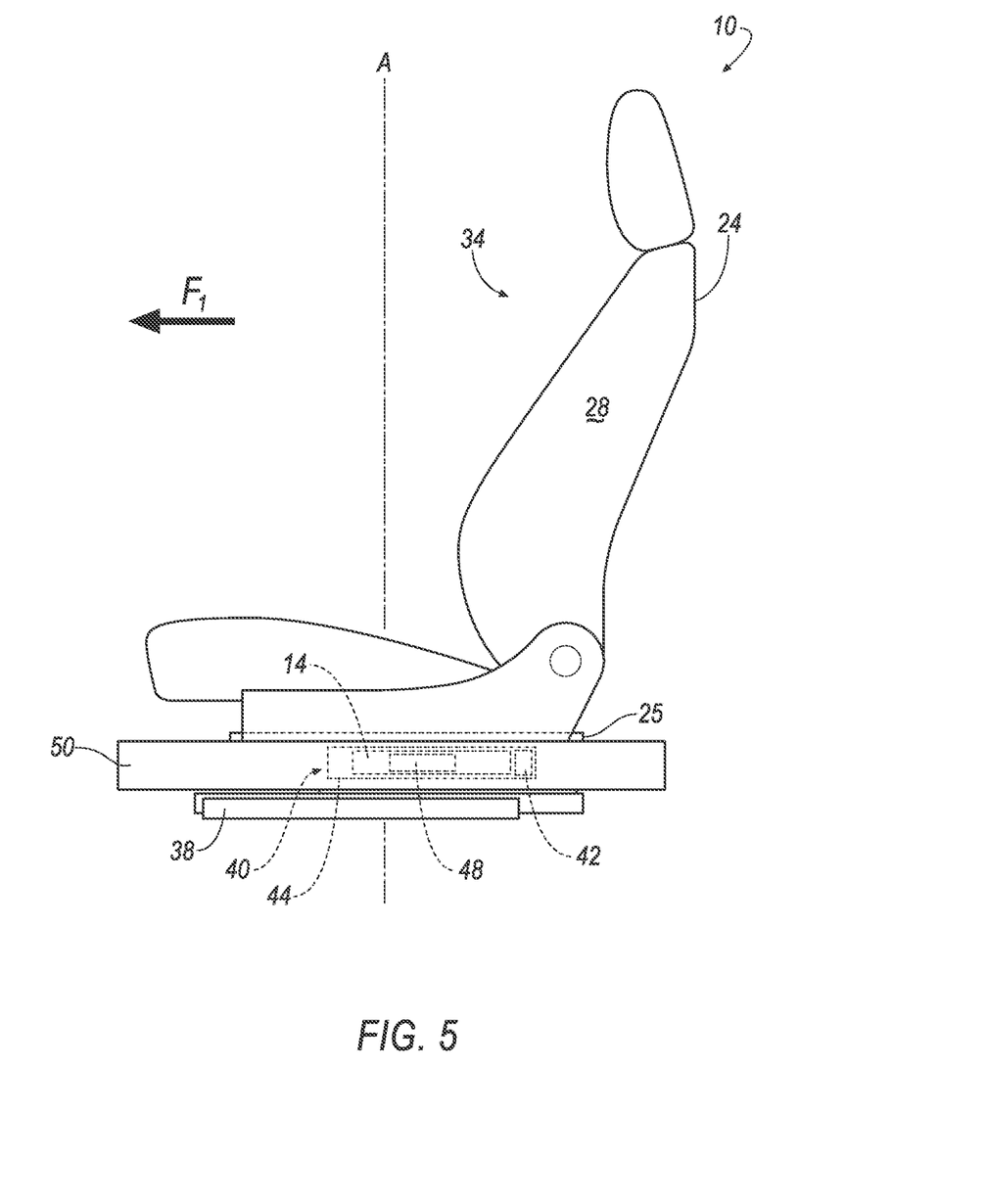
FIG. 5 is a side view of the seat in the first position.
Figure 6:
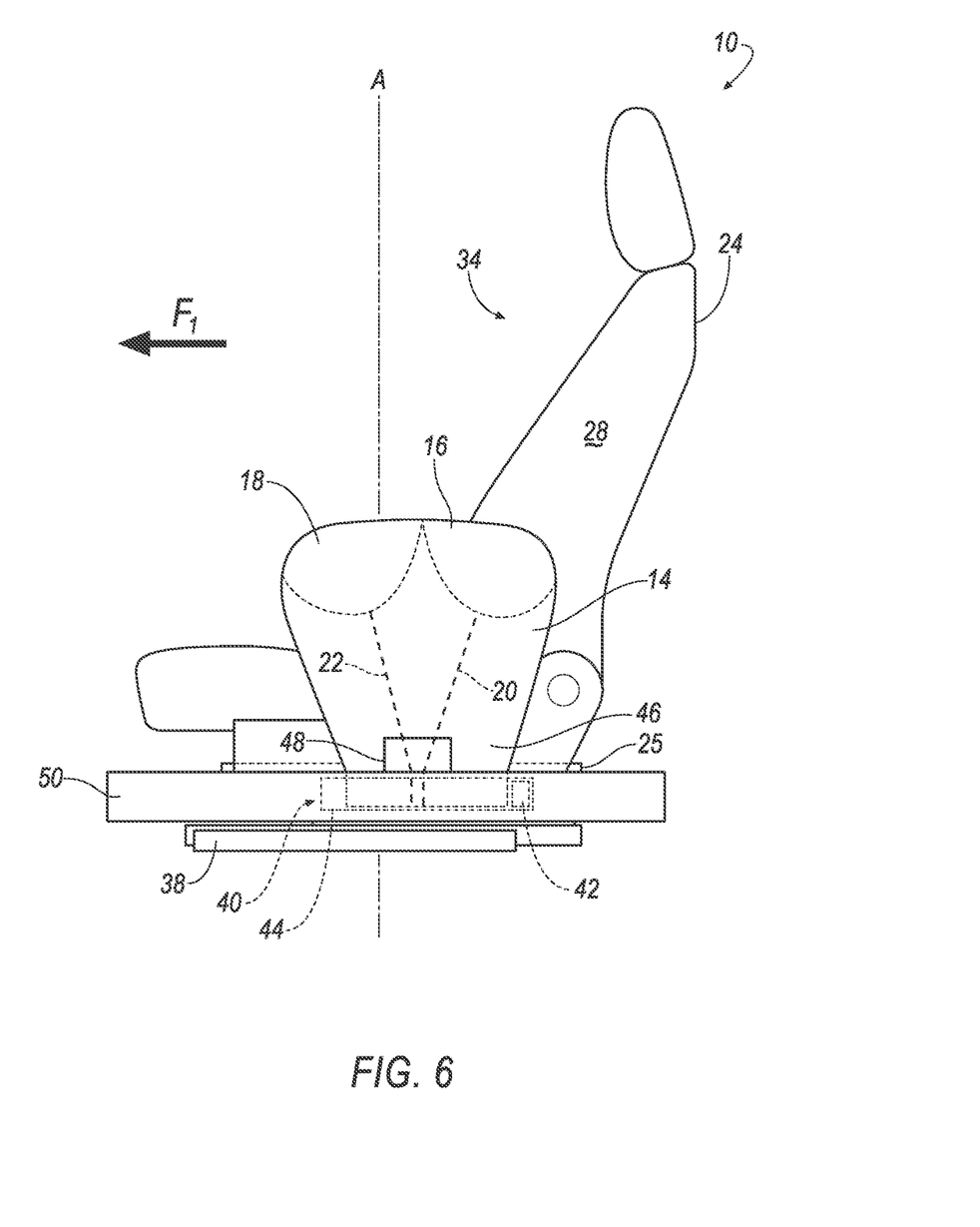
FIG. 6 is a side view of the seat and an airbag.

The vehicle 12 includes a door 36. As shown in FIGS. 1-4, the airbag 14 may be between the door 36 and the seat 24. The door 36 includes a door outer, a door inner, and a trim panel. The door outer may be fixed to the door inner by flanging, welding, or in any other suitable fashion. The trim panel is fixed to the door inner in any suitable way, e.g., threaded fasteners, clips, push-pins, Christmas tree fasteners, etc. The door outer and the door inner may be formed of metal (e.g., aluminum, steel, etc.), composite material (e.g., fiber reinforced thermoplastic, sheet molding compound (SMC), etc., or any suitable material. The door outer may have a class-A surface facing exteriorly, i.e., a surface specifically manufactured to have a high quality, finished aesthetic appearance free of blemishes. The trim panel may be formed of plastic, foam, leather, vinyl, etc. and combinations thereof. The trim panel may have a class-A surface facing a passenger cabin, i.e., a surface specifically manufactured to have a high quality, finished aesthetic appearance free of blemishes. The door 36 faces one of the sides 28, 30 of the seat 24. For example, when the seat 24 is in the first position, the door 36 faces the first side 28 of the seat 24, as shown in FIGS. 1 and 3. In another example, when the seat 24 is in the second position, the door 36 faces the second side 30 of the seat 24, as shown in FIGS. 2 and 4.

The system 10 may include a track 38, as shown in FIGS. 1-2, 5-10. The seat 24 is selectively slidable relative to the track 38. That is, the occupant may slide the seat 24 along the track 38 and may secure the seat to the track 38 at a selected position. For example, the occupant may actuate a motor (not shown) that moves the seat 24 along the track 38. The seat 24 may move vertically relative to the track 38 (not shown in the Figures).

The system 10 includes an airbag module 40, as shown in FIGS. 5-10. The airbag module 40 includes the airbag 14, an inflator 42, and a housing 44. The inflator 42 and the airbag 14 may be disposed in the housing 44 in the uninflated position. The housing 44 provides a reaction surface for the airbag 14 in the inflated position. The housing 44 may be formed of any material, e.g., a rigid polymer, a metal, a composite, etc.

The airbag module 40 includes the airbag 14, as shown in FIGS. 1-10. The airbag 14 may be formed of a woven polymer or any other material. As one example, the airbag may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 14 may be disposed between the vehicle door 36 and one of the sides 28, 30 of the seat 24. The airbag 14 may inflate along one of the sides 28, 30 of the seat, as shown in FIGS. 1-2, 6-7, and 9-10.

The airbag 14 includes the first lobe 16 and the second lobe 18, as shown in FIGS. 1-4, 6-7, and 9-10. The first lobe 16 is designed to inflate toward the first facing direction $F_1$. The second lobe 18 is designed to inflate toward the second facing direction $F_2$. When the seat 24 faces the first facing direction $F_1$ in the first position, the first lobe 16 inflates toward the first facing direction $F_1$. When the seat 24 faces the second facing direction $F_2$ in the second position, the second lobe 18 inflates toward the second facing direction $F_2$. The first lobe 16 and the second lobes 18 may control kinematics of an upper portion of the test dummy, e.g., a thoracic region. During the impact, one of the first lobe 16 or the second lobe 18 inflates.

The airbag 14 may include a lower lobe 46, as shown in FIGS. 6-7 and 9-10. The lower lobe 46 may support the first lobe 16 and the second lobe 18. The lower lobe 46 may control kinematics of a lower portion of the test dummy, e.g., a pelvic region of the test dummy. The inflator 42 inflates the lower lobe 46 during the impact.

The airbag 14 includes the first tether 20 and the second tether 22, as shown in FIGS. 6-7 and 9-10. The first tether 20 is connected to the first lobe 16. The first tether 20 may be connected to another suitable connection point, e.g., to another portion of the airbag 14. The second tether 22 is connected to the second lobe 18. The second tether 22 may be connected to another suitable connection point, e.g., to another portion of the airbag 14. Upon inflation of the lower lobe 46, the first tether 20 secures the first lobe 16 and the second tether 22 secures the second lobe 18, preventing further inflation of the first lobe 16 and the second lobe 18.

The airbag 14 may include a tether release 48, as shown in FIGS. 5-10. The tether release 48 may be, e.g., pyrotechnically actuated. The tether release 48 may be a cutter that cuts one of the tethers 20, 22. Alternatively, the tether release 48 may be a post that releases an end of one of the tethers 20, 22. The tether release 48 cuts one of the first tether 20 or the second tether 22. Upon cutting the first tether 20, the first lobe 16 inflates. Upon cutting the second tether 22, the second lobe 18 inflates.

The system 10 may include a table 50, as shown in FIGS. 1-2, 5-10. The airbag 14 may be fixed to the table 50, i.e., directly attached to the table 50. That is, the airbag module 40 may be fixed to the table 50. The seat 24 may be rotatable relative to the table 50. For example, the seat 24 may be rotatable about an axis A normal to the table, i.e., perpendicular to a plane defined by the table 50, as shown in FIGS. 5-10. When the airbag module 40 is fixed to the table 50, the seat 24 may be rotatable relative to the airbag 14. The table 50 may be slidable relative to the track 38, allowing the seat 24 to slide along the track 38. The rotation device 25 may be supported by the table 50. That is, the rotation device 25 may rotate the seat 24 relative to the table 50.

The system 10 includes the computer 26, as shown in FIG. 11. The computer 26 includes a processor 52 and a memory 54. The memory 54 stores instructions executable by the processor 52. The computer 26 may be programmed to actuate the inflator 42 to inflate the airbag 14 and to actuate the tether release 48 to release one of the first tether 20 or the second tether 22 during the impact.

The computer 26 may be programmed to detect the impact and, then, release one of the first tether 20 or the second tether 22. The computer 26 may be programmed to inflate the first lobe 16 toward the first facing direction $F_1$ when the seat is in the first position. That is, as described above, the computer 26 may be programmed to release the first tether 20 and to actuate the inflator 42, inflating the lower lobe 46 and the first lobe 16. The computer 26 may receive the position of the seat 24 from the seat position sensor 32. The computer 26 may be programmed to inflate the second lobe 18 toward the second facing direction $F_2$ when the seat 24 is in the second position. That is, the computer 26 may be programmed to release the second tether 22 and to actuate the inflator 42, inflating the lower lobe 46 and the second lobe 18.

The vehicle 12 includes an impact sensor 56. The impact sensor 56 may detect different impacts, e.g., a front impact, an oblique impact, a side impact, etc. The impact sensor 56 may be of any suitable type, e.g., post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The vehicle 12 may include a plurality of impact sensors 56 located at numerous points in or on the vehicle 12. The computer 26 may, upon receiving information from the impact sensor 56 indicating the impact, actuate the inflator 42 and the tether release 48.

The computer 26 may be programmed to actuate the tether release 48 to release the first tether 20 or the second tether 22. Based on the facing direction and/or the position of the seat 24, the computer 26 may selectively actuate the tether release 48. For example, when the seat 24 is in the first position, the computer 26 may actuate the tether release 48 to release the first tether 20. In another example, when the seat 24 is in the second position, the computer 26 may actuate the tether release 48 to release the second tether 22.

Figure 7:
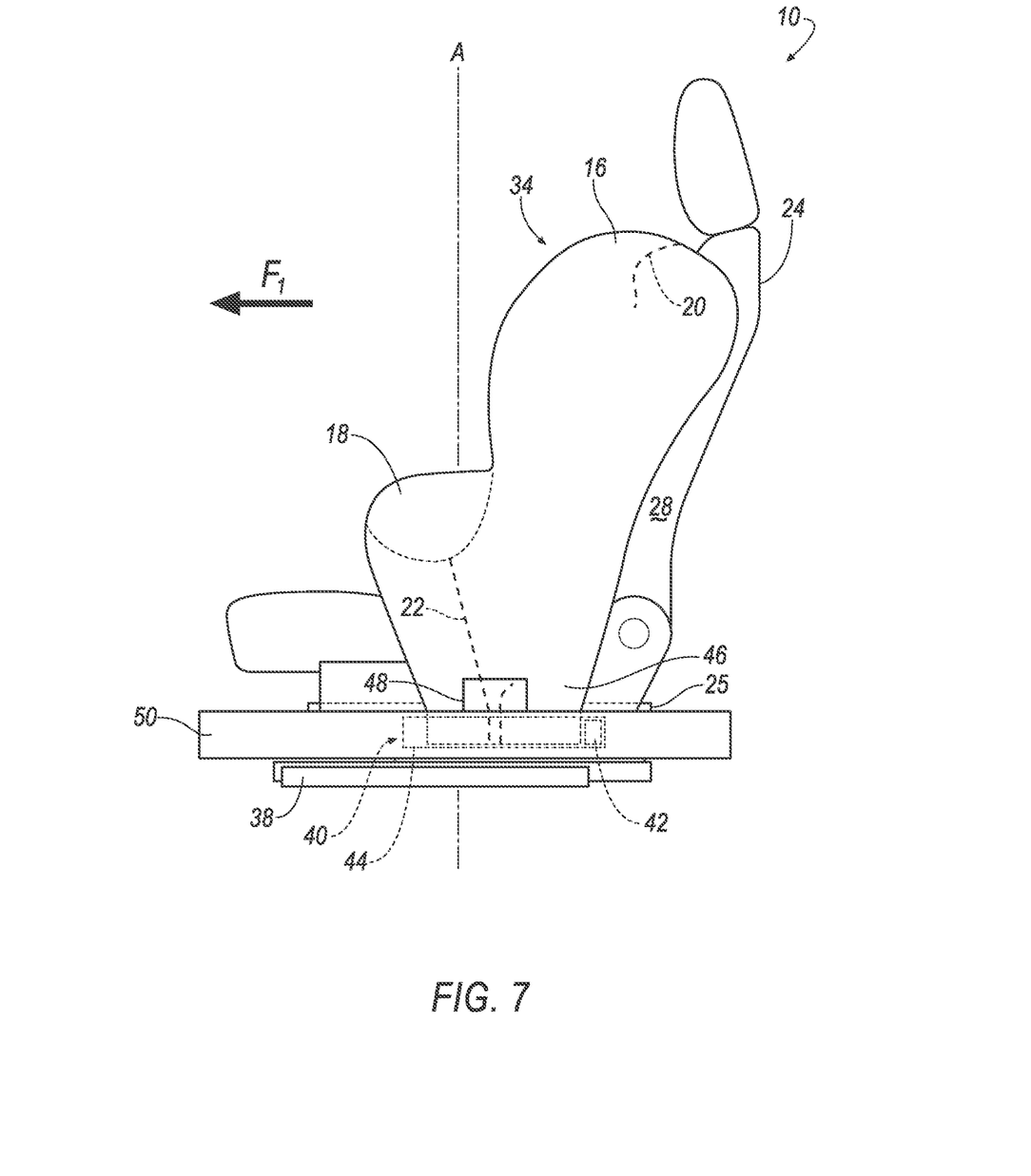
FIG. 7 is a side view of the seat and a first tether of the airbag released.
Figure 8:
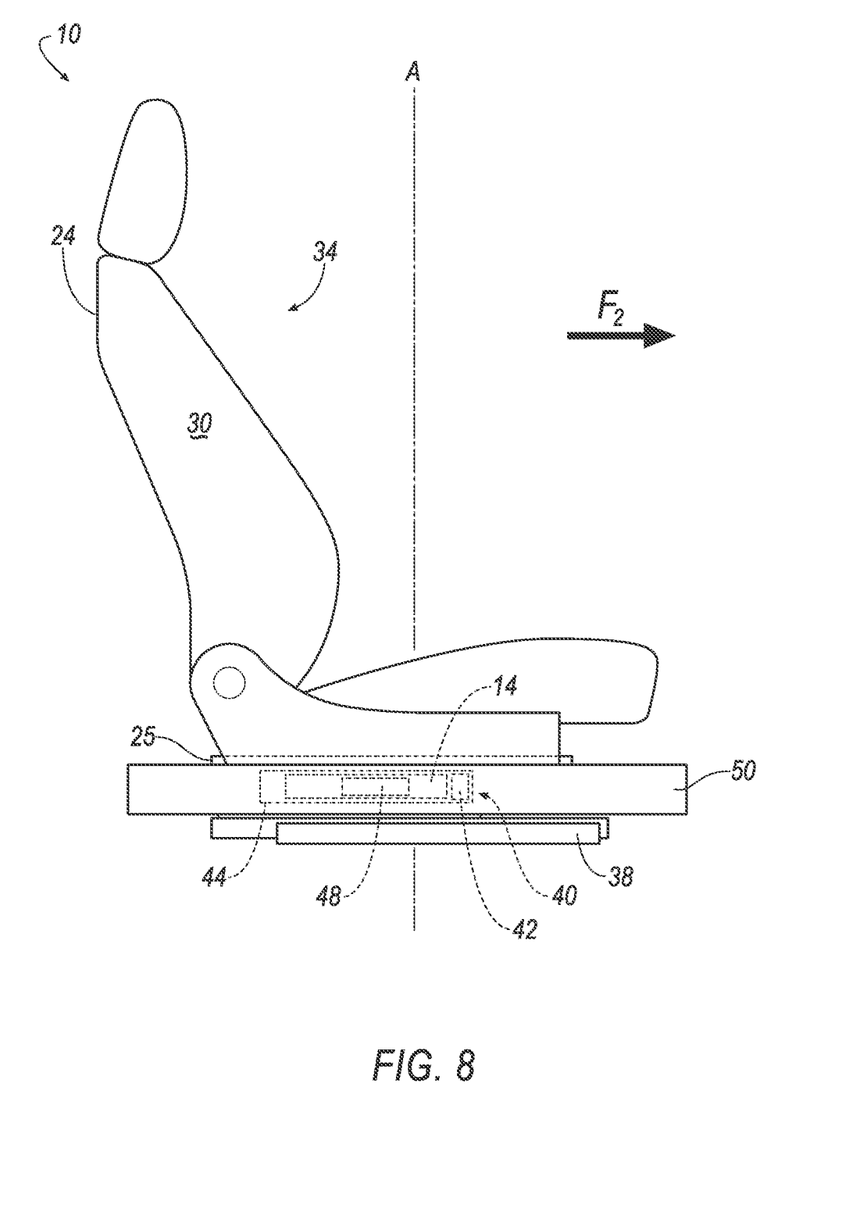
FIG. 8 is a side view of the seat in the second position.
Figure 9:
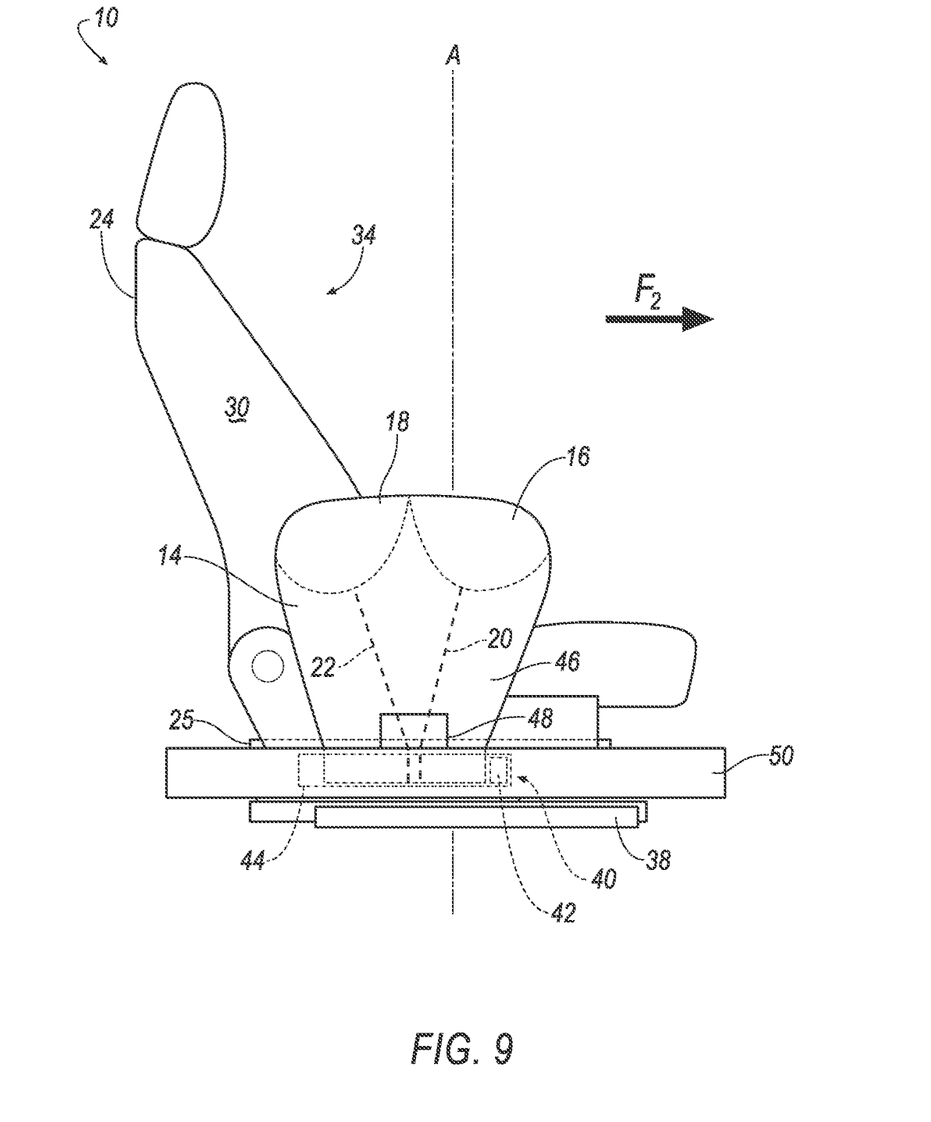
FIG. 9 is a side view of the seat and the airbag.

The computer 26 may be programmed to inflate the airbag 14 along the side 28, 30 of the seat 24. As described above, the computer 26 may, upon detecting the impact, actuate the inflator 42. The inflator 42 inflates the airbag 14 along the side 28, 30 of the seat. When the seat 24 is in the first position, the computer 26 may actuate the tether release 48 to release the first tether 20, inflating the first lobe 16 along the first side 28 of the seat 24, as shown in FIG. 7. When the seat 24 is in the second position, the computer 26 may actuate the tether release 48 to release the second tether 22, inflating the second lobe 18 along the second side 30 of the seat 24, as shown in FIG. 10.

The computer 26 is programmed to identify a facing direction $F_1$, $F_2$ of the seat 24. Based on the facing direction $F_1$, $F_2$, the compute 26 is programmed to release one of the first tether 20 connected to the first lobe 16 of the airbag 14 or the second tether 22 connected to the second lobe 18 of the airbag 14. The computer 26 may be programmed to inflate one of the first lobe 16 of the airbag 14 or the second lobe 18 of the airbag 14 based on the facing direction $F_1$, $F_2$.

To facilitate communications, the computer 26, the impact sensor 56, the inflator 42, the tether release 48, the seat position sensor 32, and other components in the vehicle 12 may be connected to a communication bus 58, such as a controller area network (CAN) bus, of the vehicle 12. The computer 26 may use information from the communication bus 58 to control the triggering of the inflator 42 and the tether release 48. The tether release 48 may be connected to the computer 26 or may be connected to the communication bus 58.

Figure 12:
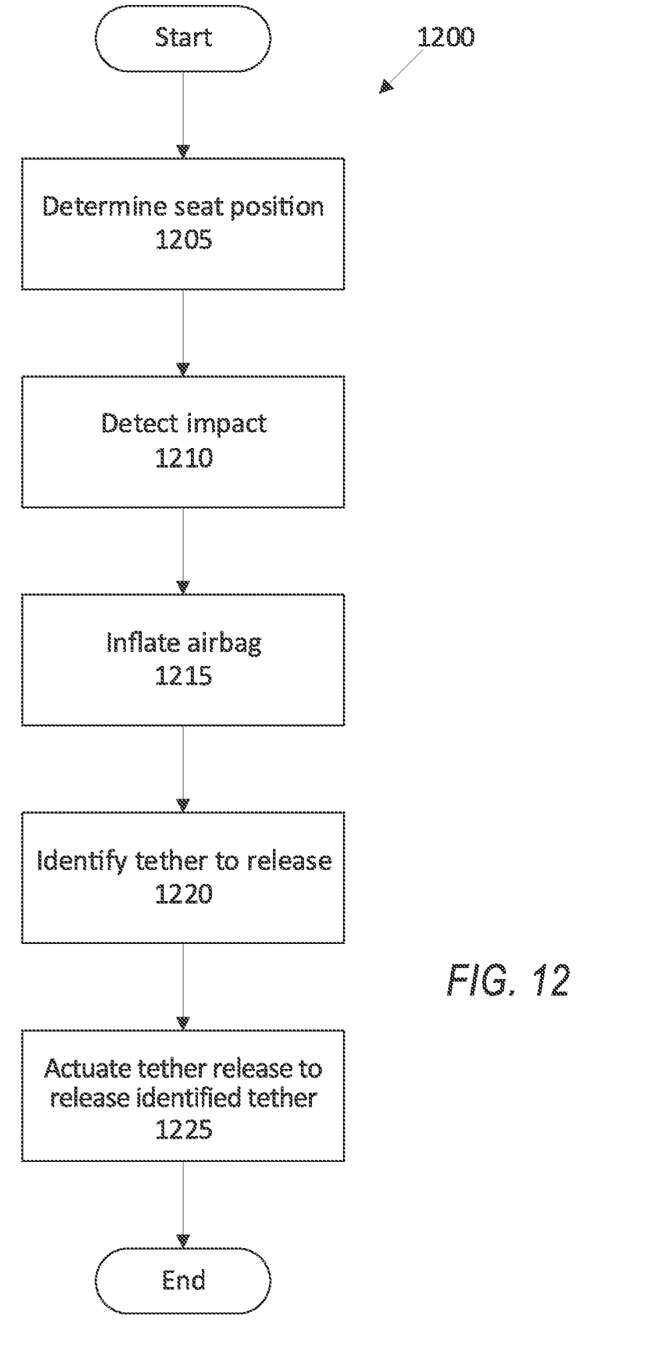
FIG. 12 is a block diagram of a process for inflating the airbag.

FIG. 12 illustrates a process 1200 for inflating the airbag 14 during the impact. The process 1200 begins in a block 1205, in which the computer 26 determines the position of the seat 24. As described above, the seat 24 may be in the first position, the second position, or an intermediate position between the first position and the second position. The computer 26 may determine the position of the seat 24 based on input from the seat position sensor 32. The computer 26 may identify the facing direction $F_1$, $F_2$ of the seat 24 based on the position of the seat 24.

Next, in a block 1210, the computer 26 detects the impact. As described above, the impact sensor 56 is programmed to detect the impact and transmit information indicating the impact over the communications bus 58 to the computer 26.

Next, in a block 1215, the computer 26 inflates the airbag 14. The computer 26 actuates the inflator 42 to inflate the airbag 14. For example, the computer 26 may actuate the inflator 42 to inflate the lower lobe 46 of the airbag 14.

Next, in a block 1220, the computer 26 identifies one of the first tether 20 or the second tether 22 to release. The computer 26 identifies the first tether 20 to release when the seat 24 is in the first position. The computer 26 identifies the second tether 22 to release with the seat 24 is in the second position. The computer 26 may be programmed to identify one of the first tether 20 or the second tether 22 when the seat 24 is in the intermediate position between the first position and the second position. The computer 26 may identify the tether 20, 22 to release based on the facing direction $F_1$, $F_2$.

Next, in a block 1225, the computer 26 actuates the tether release 48 to release the first tether 20 or the second tether 22. Upon identifying the tether 20, 22 to release, the computer 26 instructs the tether release 48 to release the identified tether 20, 22. Upon releasing the identified tether 20, 22, the corresponding lobe 16, 18 to which the tether 20, 22 is connected inflates. Following the block 1225, the process 1200 ends.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 1200, one or more of the steps could be omitted, or the steps could be executed in a different order than shown in FIG. 12. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order.

Many modifications and variations of the present disclosure are possible in light of the above teachings, and the disclosure may be practiced otherwise than as specifically described.

What is claimed is:

1. A system, comprising:
an airbag including a first lobe inflatable in a vehicle-rearward direction to an inflated position, a second lobe inflatable in a vehicle-forward direction to an inflated position, a first tether connected to the first lobe and extending in the vehicle-rearward direction from the first lobe in the inflated position, and a second tether connected to the second lobe and extending in the vehicle-forward direction from the second lobe in the inflated position;
a seat rotatable relative to the airbag from a first position in which the seat faces in the vehicle-forward direction to a second position in which the seat faces in the vehicle rearward direction; and
a computer programmed to release the first tether when the seat is in the first position and to release the second tether when the seat is in the second position;
wherein the airbag is disposed below the seat in an uninflated position, the first lobe is inflatable upwardly along the seat to the inflated position, and the second lobe is inflatable upwardly along the seat to the inflated position.

2. The system of claim 1, wherein the computer is further programmed to detect an impact and, then, release one of the first tether or the second tether.

3. The system of claim 1, further comprising a table, wherein the airbag is fixed to the table and the seat is supported on top of the table, wherein the seat is rotatable relative to the table, wherein the first lobe is inflatable upwardly from the table along the seat, the second lobe is inflatable upwardly from the table along the seat, the first tether extends upwardly from the table to the first lobe, and the second tether extends upwardly from the table to the second lobe.

4. The system of claim 3, wherein the seat is rotatable about an axis normal to the table.

5. The system of claim 1, further comprising a tether release, wherein the computer is further programmed to actuate the tether release to release the first tether or the second tether.

6. The system of claim 1, wherein the seat has a side and the computer is further programmed to inflate the airbag along the side.

7. The system of claim 1, wherein the seat faces the vehicle-forward direction in the first position and the seat faces the vehicle-rearward direction in the second position.

8. The system of claim 1, further comprising a vehicle door, wherein the airbag is between the vehicle door and the seat.

9. The system of claim 1, wherein the seat is rotatable to an intermediate position between the first position and the second position.

10. A system, comprising a computer including a processor and a memory, the memory storing instructions executable by the processor to:

identify a facing direction of a vehicle seat, the facing direction including a vehicle-forward direction and a vehicle-rearward direction; and
based on the facing direction, release one of a first tether connected to a first lobe of an airbag or a second tether connected to a second lobe of the airbag;
wherein the airbag is disposed below the seat in an uninflated position, the first lobe is inflatable in the vehicle-rearward direction upwardly along the vehicle seat, the second lobe is inflatable in the vehicle-forward direction upwardly along the vehicle seat, the first tether extends in the vehicle-rearward direction and the second tether extends in the vehicle-forward direction.

11. The system of claim 10, wherein the instructions further include instructions to detect an impact and, then, release one of the first tether or the second tether.

12. The system of claim 10, wherein the instructions further include instructions to actuate a tether release to release the first tether or the second tether.

13. The system of claim 10, wherein the instructions further include instructions to inflate one of the first lobe of the airbag or the second lobe of the airbag based on the facing direction.

14. The system of claim 10, wherein the facing direction of the seat includes a vehicle-forward direction and a vehicle-rearward direction, and the first lobe is arranged to inflate in the vehicle-rearward direction when the facing direction is the vehicle-forward direction and the second lobe is arranged to inflate in the vehicle-forward direction when the facing direction is the vehicle-rearward direction.

15. The system of claim 10, wherein the seat defines an occupant seating area facing toward the facing direction.

16. An assembly, comprising:
a track;
a table slidable relative to the track;
an airbag fixed to the table including a first lobe inflatable in a vehicle-rearward direction, a second lobe inflatable in a vehicle-forward direction, a first tether connected to the first lobe and extending in the vehicle-rearward direction, and a second tether connected to the second lobe and extending in the vehicle-forward direction; and
a seat supported on top of the table, the seat being rotatable relative to the table and the airbag from a first position to a second position;
wherein, in the first position, the seat faces in the vehicle-forward direction and, in the second position, the seat faces in the vehicle-rearward direction, the first lobe is inflatable upwardly from the table along the seat when the seat faces the vehicle-forward direction, and the second lobe is inflatable upwardly from the table along the seat when the seat faces the vehicle-rearward direction.

17. The assembly of claim 16, wherein the seat is rotatable about an axis normal to the table.

18. The system of claim 14, wherein the instructions further include instructions to release the first tether when the facing direction is the vehicle-forward direction and to release the second tether when the facing direction is the vehicle-rearward direction.

* * * * *

UNITED STATES PATENT AND TRADEMARK OFFICE
CERTIFICATE OF CORRECTION

PATENT NO. : 10,821,928 B2
APPLICATION NO. : 16/156405
DATED : November 3, 2020
INVENTOR(S) : Deng et al.

Page 1 of 1

It is certified that error appears in the above-identified patent and that said Letters Patent is hereby corrected as shown below:

In the Claims

Column 8, Line 23, please amend Claim 14 as follows:
14. The system of claim 11, wherein the facing direction of and a in the vehicle-rearward direction when the facing direction is the vehicle-forward direction and the second lobe is arranged to inflate in the vehicle-forward direction when the facing direction is the vehicle-rearward direction.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*